US011205053B2

(12) United States Patent
Contreras et al.

(10) Patent No.: US 11,205,053 B2
(45) Date of Patent: Dec. 21, 2021

(54) SEMANTIC EVALUATION OF TENTATIVE TRIGGERS BASED ON CONTEXTUAL TRIGGERS

(71) Applicant: International Business Machines Corporation, Armonk, NY (US)

(72) Inventors: David Contreras, Willow Spring, NC (US); Kandhan Sekar, Durham, NC (US); Thomas Hay Rogers, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/830,599

(22) Filed: Mar. 26, 2020

(65) Prior Publication Data

US 2021/0303794 A1 Sep. 30, 2021

(51) Int. Cl.
| | |
|---|---|
| *G06F 40/143* | (2020.01) |
| *G06F 40/30* | (2020.01) |
| *G06F 40/40* | (2020.01) |
| *G06F 40/14* | (2020.01) |
| *G06F 40/205* | (2020.01) |

(52) U.S. Cl.
CPC .............. *G06F 40/30* (2020.01); *G06F 40/14* (2020.01); *G06F 40/205* (2020.01); *G06F 40/40* (2020.01)

(58) Field of Classification Search
CPC ........ G06F 40/14; G06F 40/205; G06F 40/30; G06F 40/40
See application file for complete search history.

(56) References Cited

U.S. PATENT DOCUMENTS

| | | | |
|---|---|---|---|
| 9,569,729 B1 | 2/2017 | Oehrle et al. | |
| 10,276,170 B2 | 4/2019 | Gruber et al. | |
| 10,831,811 B2* | 11/2020 | Kraus | G06F 16/243 |
| 2002/0107844 A1* | 8/2002 | Cha | G06F 16/3344 |
| 2006/0053000 A1* | 3/2006 | Moldovan | G06F 16/243 704/9 |
| 2010/0094846 A1 | 4/2010 | Rouhani-Kalleh | |
| 2015/0135053 A1* | 5/2015 | Doornenbal | G06F 40/30 715/230 |
| 2017/0024461 A1* | 1/2017 | Mac an tSaoir | G06F 16/334 |
| 2017/0371860 A1* | 12/2017 | McAteer | G06F 40/30 |

(Continued)

OTHER PUBLICATIONS

A. Judea, et al., "Incremental Global Event Extraction", Proceedings of COLING 2016, the 26th International Conference on Computational Linguistics: Technical Papers, pp. 2279-2289, Osaka, Japan, Dec. 11-17, 2016. 11 pages.

(Continued)

*Primary Examiner* — Keith D Bloomquist
(74) *Attorney, Agent, or Firm* — John Noh; SVL IPLaw

(57) ABSTRACT

Methods, systems and computer readable media are provided for semantic evaluation of tentative triggers based on contextual triggers. Contextual triggers are identified within text. A parse tree comprising a plurality of nodes is generated corresponding to the text. Tentative triggers are identified within the text. A determination is made as to whether one or more nodes of the parse tree corresponding to the tentative trigger is within a context of one or more nodes of the parse tree corresponding to the contextual triggers. Based on the determination, the tentative trigger type is assigned to a contextual trigger type.

18 Claims, 6 Drawing Sheets

(56) References Cited

U.S. PATENT DOCUMENTS

2018/0075011 A1    3/2018  Allen et al.
2018/0232443 A1*   8/2018  Delgo .................... G06F 16/35

OTHER PUBLICATIONS

T. Strat, et al., Context-Based Vision: Recognizing Objects Using Information From Both 2D and 3D Imagery, IEEE Transactions on Pattern Analysis and Machine Intelligence 13.10 (1991): 1050-1065, 34 pages.
T. Heimonen, Academic Dissertation, Design and Evaluation of User Interfaces for Mobile Web Search, Nov. 20, 2012, 172 pages.
IBM, et al., "Profile driven approach for Efficient parsing of Ambiguous Grammar", IPCOM000191310D, Dec. 29, 2009, 5 pages.
S. Shirwadkar, et al., "Method and System for Processing and Answering Factual Questions Over Structured Data", IPCOM000258994D, Jul. 2, 2019, 6 pages.
IBM et al., "Checking for Ambiguous References within Written Text", IPCOM000167268D, Feb. 5, 2008, 3 pages.
G. Thompson, et al., "Evaluation in Context", Book, vol. 242, John Benjamins Publishing Company, 2014, pp. 1-100 (113 pages).
G. Thompson, et al., "Evaluation in Context", Book, vol. 242, John Benjamins Publishing Company, 2014, pp. 101-200 (100 pages).
G. Thompson, et al., "Evaluation in Context", Book, vol. 242, John Benjamins Publishing Company, 2014, pp. 201-300 (100 pages).
G. Thompson, et al., "Evaluation in Context", Book, vol. 242, John Benjamins Publishing Company, 2014, pp. 301-431 (118 pages).

* cited by examiner

ResolveTypeConflict (hypothetical, negation) = hypothetical
ResolveTypeConflict (hypothetical, prior) = hypothetical
ResolveTypeConflict (hypothetical, negation, prior) = hypothetical ResolveTypeConflict (hypothetical, confirm) = confirm
ResolveTypeConflict (negation, confirm) = confirm
ResolveTypeConflict (hypothetical, negation, confirm) = confirm ResolveTypeConflict (negation, prior) = negation ResolveTypeConflict (confirm, prior) = prior
ResolveTypeConflict (negation, confirm, prior) = prior
ResolveTypeConflict (hypothetical, confirm, prior) = prior
ResolveTypeConflict (hypothetical, negation, confirm, prior) = prior

FIG.3

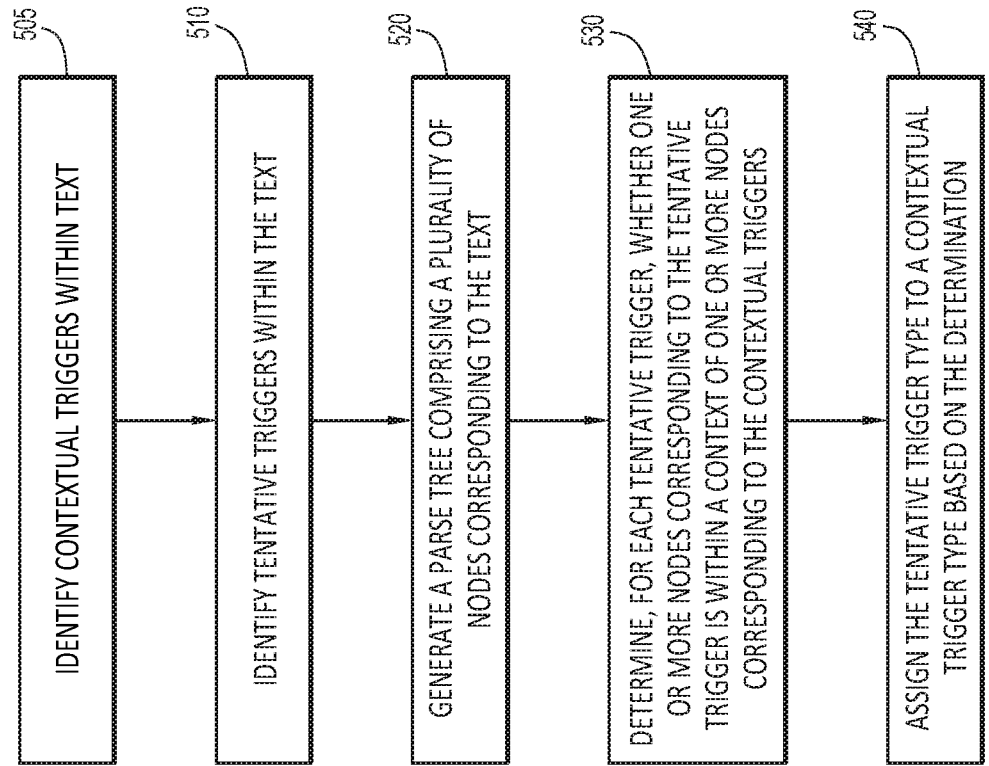

SEMANTIC EVALUATION OF TENTATIVE TRIGGERS BASED ON CONTEXTUAL TRIGGERS

1. TECHNICAL FIELD

Present invention embodiments relate to natural language processing, and in particular, identifying a tentative trigger within a context of contextual trigger(s), and promoting the tentative trigger to be of the same context type as the contextual trigger.

2. DISCUSSION OF THE RELATED ART

A central issue in natural language processing (NLP) is the semantic interpretation of text. A bag-of-words model does not preserve information about the order or structure of words in a document. In cases in which the same words may be used in different contexts and have different meanings, a bag of words model provides limited insight into the semantic meaning of a sentence.

Other approaches, which may include bi-gram or tri-gram models, are of limited use, especially in long sentences in which there are multiple changes of semantic polarity.

SUMMARY

According to embodiments of the present invention, methods, systems, and computer readable media are provided for semantic evaluation of tentative triggers based on contextual triggers. Contextual triggers and tentative triggers are identified within text. A parse tree comprising a plurality of nodes corresponding to the text is generated. For each tentative trigger, a determination is made as to whether one or more nodes of the parse tree corresponding to the tentative trigger is within a context of one or more nodes of the parse tree corresponding to the contextual triggers. Based on the determination, the tentative trigger type is assigned to a contextual trigger type.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Generally, like reference numerals in the various figures are utilized to designate like components.

FIG. 3 is an illustration showing ruled-based mapping for determining a contextual trigger type for a tentative trigger, according to an embodiment of the present invention.

FIG. 5 shows a high level flowchart of operations for determining semantic context, according to an embodiment of the present invention.

DETAILED DESCRIPTION

Techniques are proposed in which contextual triggers and tentative triggers are identified. A contextual trigger refers to a span of text which indicates a defined semantic interpretation of its surrounding context. Examples of contextual triggers with defined semantic interpretations include but are not limited to text indicating a hypothetical (e.g., referring to an event that might occur in the future), a negation (e.g., referring to an event that did not occur), a prior event (e.g., referring to an event that previously occurred), etc. A tentative trigger refers to a span of text with an ambiguous semantic interpretation, which can be disambiguated when the tentative trigger is in the context of one or more contextual triggers.

Parse trees are used to determine semantic analysis by considering the relationships between nodes in the tree. However, parse tree generation algorithms are often unreliable when processing longer sentences with multiple changes in semantic polarity. Present techniques offer an improvement in semantic analysis, by using local contextual analysis to resolve ambiguousness for identified tentative triggers, by promoting the tentative trigger, within a span of a contextual trigger, to the corresponding contextual trigger type.

Figure 1A:
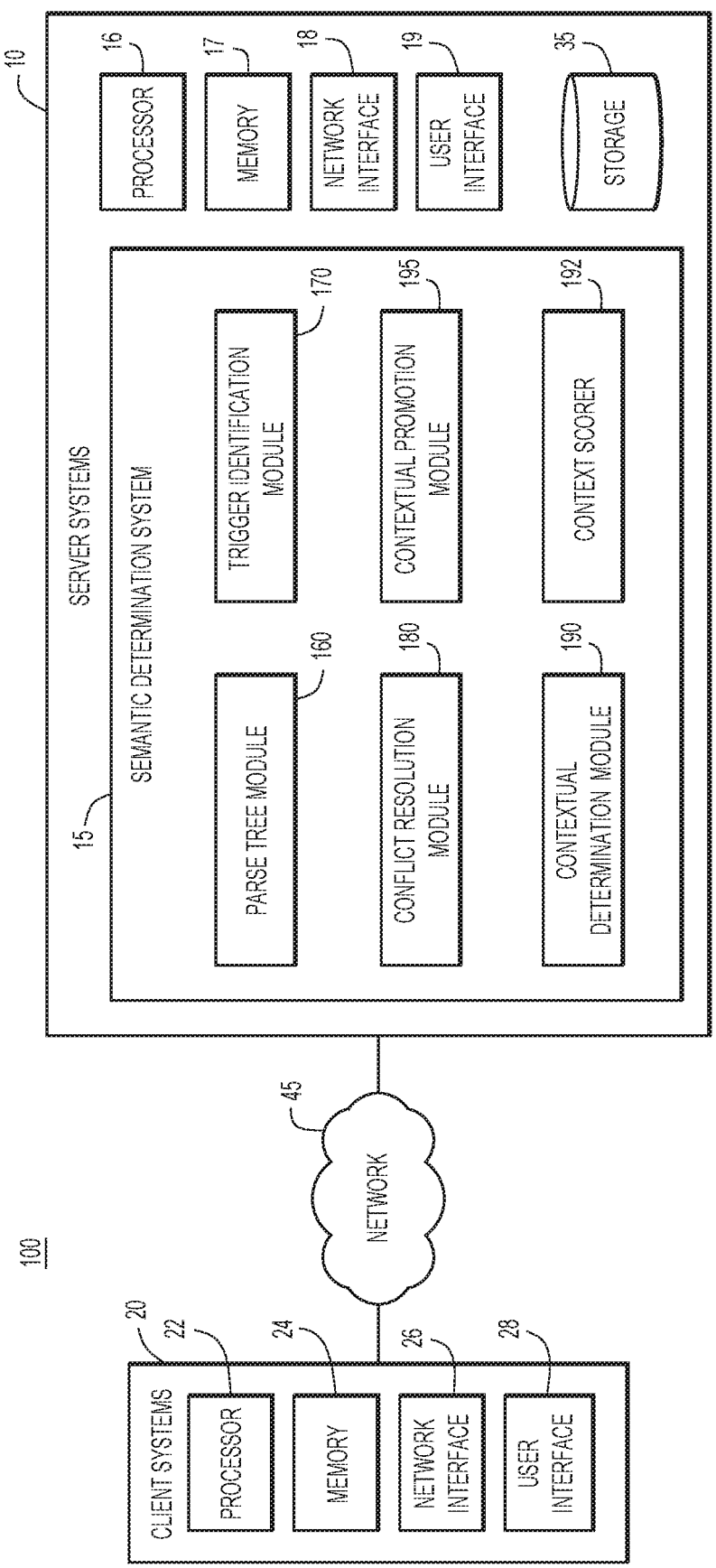
FIG. 1A is a diagrammatic illustration of an example computing environment for a semantic determination system, according to an embodiment of the present invention.

An example environment for use with present invention embodiments is illustrated in FIG. 1A. Specifically, the environment includes one or more server systems 10, one or more client or end-user systems 20, and a network 45. Server systems 10 and client systems 20 may be remote from each other and may communicate over a network 45. The network may be implemented by any number of any suitable communications media, such as a wide area network (WAN), a local area network (LAN), Internet, Intranet, etc. Alternatively, server systems 10 and client systems 20, may be local to each other, and may communicate via any appropriate local communication medium, such as local area network (LAN), hardwire, wireless link, Intranet, etc.

Client systems 20 enable users to receive information from server systems 10, and to access the output of the semantic determination system operating on server systems 10.

Server systems 10 may comprise or have access to a storage database 35 that may store various types of information for semantic determination systems. For example, server systems 10 may store tentative trigger lists, contextual trigger lists, lists of tentative triggers promoted to a contextual trigger types, etc. in storage 35. Storage database 35 may include any suitable information in a structured, semi-structured, or unstructured format.

Storage database 35 may be implemented by any conventional or other database or storage unit, may be local to or remote from server systems 10 and client systems 20 and may communicate via any appropriate communication medium, such as local area network (LAN), wide area network (WAN), Internet, hardwire, wireless link, Intranet, etc. The client systems may present a graphical user interface 28, such as a GUI, etc., or other interface, such as command line prompts, menu screens, etc., to obtain information pertaining to user interactions with the system, and may allow a user to obtain results of the semantic determination system in operation, as well as to configure operation of the semantic determination system.

Server systems 10 and client systems 20 may be implemented by any conventional or other computer systems preferably equipped with a display or monitor, a base (including at least one hardware processor (e.g., microprocessor, controller, central processing unit (CPU), etc.), one or more memories and/or internal or external network interfaces or communications devices (e.g., modem, network cards, etc.), optional input devices (e.g., a keyboard, mouse or other input device), and any commercially available and custom software (e.g., server/communications software, semantic determination system, browser/interface software, etc.). By way of example, the server/client includes at least one processor 16, 22 one or more memories 17, 24 and/or internal or external network interfaces or communications devices 18, 26, such as a modem or network cards, and a user interface 19, 28, etc. The optional input devices may include a keyboard, mouse, or other input device.

Alternatively, one or more client systems 20 may perform the operations of server systems 10 in a stand-alone mode of operation. For example, the client system may store or have access to the data stored in storage 35 as well as the semantic determination system 15. The client system may provide results of the semantic determination to a user as well as allow the user to configure the semantic determination system. The graphical user or other interface 28, such as a GUI, command line prompts, menu screens, etc., may obtain information pertaining to user interactions with the system, which may be used for accessing results of the semantic determination system.

Semantic determination system 15 may include one or more modules or units to perform the various functions of present invention embodiments described herein. The various modules of the semantic determination system 15, include parse tree module 160, trigger identification module 170, conflict resolution module 180, contextual determination module 190, and contextual promotion module 195, etc.), may be implemented by any combination of any quantity of software and/or hardware modules or units, and may reside within memory 17 of the server for execution by processor 16. These modules are described in additional detail below.

Parse tree module 160 may transform linear strings of words into a tree comprising a plurality of nodes and branches, wherein the nodes and branches correspond to the structure of the sentence. For example, nouns may branch from verbs, and adjectives may branch from nouns, etc. An example of a parse tree is provided in FIG. 4. Based on this representation, the context of tentative triggers relative to contextual triggers may be evaluated.

In some aspects, each node of a parse tree may correspond to a single word or phrases consisting of two or three words. Examples provided herein are illustrative, and are not intended to be limited with respect to the number or arrangement of nodes or branches, or of the number of words per node.

Trigger identification module 170 identifies tentative triggers and contextual triggers. Tentative triggers may be identified based upon known lists of words. In general, tentative triggers are words or phrases associated with temporal or sequencing information, such as "following" or "after." Tentative triggers may occur anywhere in a sentence, and context from nearby contextual triggers may be propagated to infer the proper context of the tentative trigger. Thus, for a tentative trigger within a span of a contextual trigger, the tentative trigger may be promoted to the contextual trigger type of the corresponding contextual trigger. Contextual triggers may also be identified based upon known word lists of contextual triggers.

Contextual determination module 190 determines the context of each contextual trigger. For example, contexts of a contextual trigger may include prior, hypothetical, negation, confirm or ignore. In some cases, contextual determination module creates a promotion list for the tentative trigger. The promotion list may include one or more contextual triggers that span the tentative trigger (e.g., the tentative trigger falls within the span of or within a predetermined number of words of the contextual trigger).

Context scorer 192 determines whether a tentative trigger is within a span of a contextual trigger. A span refers to a specified distance of words in text or a specified distance of nodes of a parse tree. In some aspects, this determination is based on a length of nearby words (e.g., within 2-3 words). In other cases, this may be determined based on nearby nodes (e.g., within 1-2 nodes) of a parse tree. Thus, context scorer 192 relies more upon the local correctness of nodes of parse trees near contextual triggers, thus overcoming high-level incorrectness or malformation of parse trees.

Conflict resolution module 180 maps a plurality of different contextual trigger types to a single contextual trigger type. Rules, algorithms, or lookup tables may be used to map the plurality of contextual trigger types to a single contextual trigger type.

Once a single contextual trigger type is identified, contextual promotion module 195 promotes the tentative trigger to the determined contextual trigger type. Examples are provided below which describe this process in additional detail.

Figure 1B:
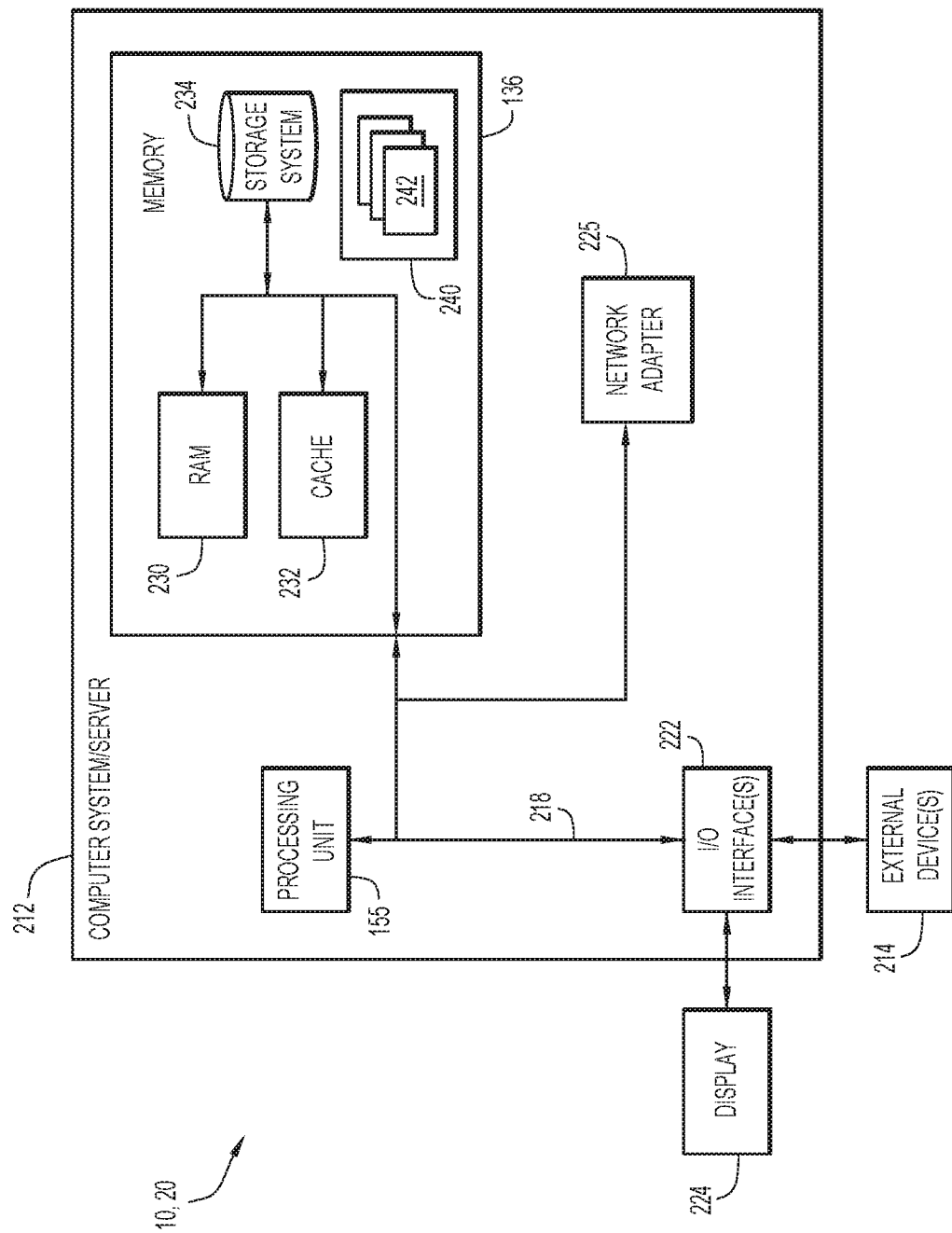
FIG. 1B is an example computing device for the computing environment of FIG. 1, according to an embodiment of the present invention.

Client systems 20 and server systems 10 may be implemented by any suitable computing device, such as computing device 212 shown in FIG. 1B for computing environment 100. This example is not intended to suggest any limitation as to the scope of use or functionality of embodiments of the invention described herein. Regardless, computing device 212 is capable of being implemented and/or performing any of the functionality set forth herein.

In the computing device, there is a computer system which is operational with numerous other general purpose or special purpose computing system environments or configurations. Examples of well-known computing systems, environments, and/or configurations that may be suitable for use with the computer system include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules (e.g., semantic determination system 15 and its corresponding modules), being executed by a computer system. Generally, program modules may include routines, programs, objects, components, logic, data structures, and so on that perform particular tasks or implement particular abstract data types.

Computer system 212 is shown in the form of a general-purpose computing device. The components of computer system 212 may include, but are not limited to, one or more processors or processing units 155, a system memory 136, and a bus 218 that couples various system components including system memory 136 to processor 155.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 136 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 136 may include at least one program product having a set (e.g., at least one) of program modules that are configured to carry out the functions of embodiments of the invention.

Program/utility 240, having a set (at least one) of program modules 242 (e.g., profile based machine learning system 15 and corresponding modules, etc.) may be stored in memory 136 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 225. As depicted, network adapter 225 communicates with the other components of computer system 212 via bus 218. It should be understood that although not shown, other hardware and/or software components could be used in conjunction with computer system 212. Examples, include, but not limited to: microcode, device drivers, redundant processing units, external disk drive arrays, RAID systems, tape drives, and data archival storage systems, etc.

Figure 2:
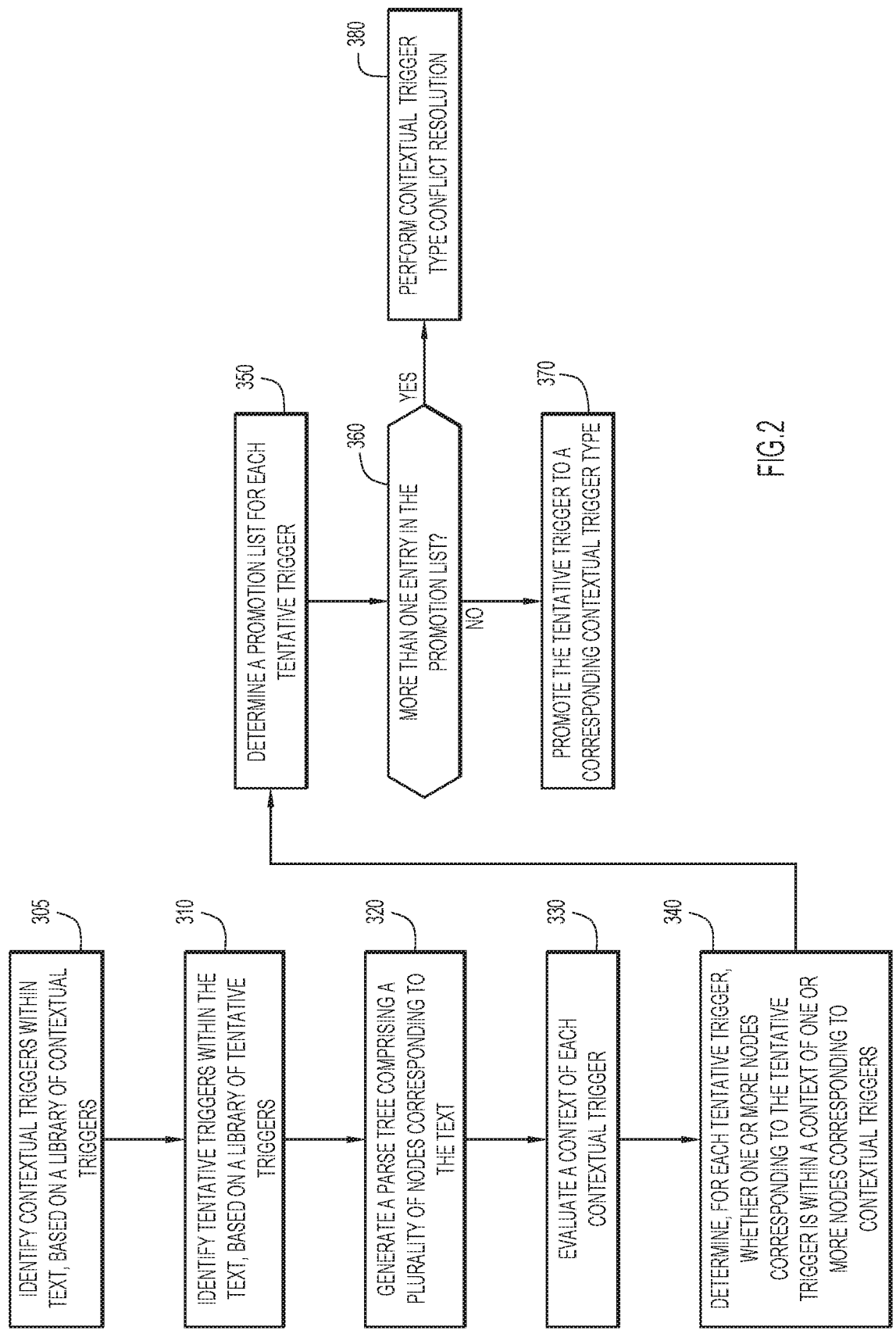
FIG. 2 is a flowchart showing semantic determination of tentative triggers, according to an embodiment of the present invention.

FIG. 2 shows a flowchart for semantic determination based on embodiments of the techniques provided herein. For each tentative trigger, a list of nearby contextual trigger types to which it can be promoted are identified. For tentative triggers falling within the context of multiple contextual trigger types, a mapping is performed by conflict resolution module 180 to map one or more contextual trigger types to a single contextual trigger type, since not all tentative triggers can be validly promoted to all contextual trigger types.

At operation 305, contextual triggers within text are identified, based on a library of contextual triggers. At operation 310, tentative triggers are identified within the text, based on a library of tentative triggers. At operation 320, a parse tree is generated comprising a plurality of nodes corresponding to the text. In some aspects, operation 320 may be implemented prior to operation 310. At operation 330, a context of each contextual trigger is evaluated. At operation 340, a determination is made for each tentative trigger as to whether one or more nodes corresponding to the tentative trigger is within a context of one or more nodes corresponding to contextual triggers.

At operation 350, a promotion list is generated for each tentative trigger, when the tentative trigger falls within the span of multiple contextual trigger types. This operation is optional when a tentative trigger falls within the context or span of one contextual trigger. For generation of the promotion list, a determination is made for each contextual trigger, as to whether the corresponding contextual trigger type is valid. Each valid contextual trigger type is added to the promotion list for that tentative trigger. Thus, for each tentative trigger, a promotion list is generated comprising one or more nearby contextual trigger types.

At operation 360, if the promotion list contains more than one entry, operation 380 is performed. Otherwise, the tentative trigger is promoted to the corresponding contextual trigger type at operation 370.

At operation 380, trigger type resolution is performed if a promotion list for a tentative trigger contains more than one contextual trigger type. Conflict resolution module may determine which contextual trigger type the tentative trigger will be promoted to. After trigger type conflict resolution is performed, the tentative trigger is promoted to a corresponding contextual trigger type at operation 370.

After promoting the tentative trigger, this process is repeated (e.g., identifying contextual triggers and promoting hypothetical triggers) until no new tentative triggers are promoted. This process allows for promotions to be propagated throughout the parse tree, since more tentative triggers may be in the context of tentative triggers that were promoted in the previous iteration. These newly promoted contextual triggers can be used to determine contextual spans.

FIG. 3 shows an illustration of rules for resolving contextual trigger type conflicts (e.g., applied by conflict resolution module 180), according to embodiments of the present invention. In FIG. 3, and with reference to operation 380, contextual trigger type conflict resolution is performed if more than one entry is present in a promotion list for a tentative trigger. This resolution scheme may be invoked when a tentative trigger is determined to be within the context of multiple contextual trigger types. In this case, promotion of the tentative trigger to a particular contextual trigger type is determined based on a series of rules. The rules map a plurality of contextual trigger types to a single contextual trigger type based on a rule, algorithm, lookup table, etc. These techniques may be extended to any number of contextual trigger types.

In some cases, a look-up table may be used for contextual trigger type resolution. In other aspects, an algorithm may be employed for contextual trigger type resolution. For example, a contextual trigger type resolution algorithm may be generated, which is a function that receives as input, a set of different contextual trigger types and returns a subset of those types (e.g., typically one contextual trigger type). In still other aspects, a multiple rules, tables, or algorithms may be employed for contextual trigger type resolution.

By way of example, an example resolution scheme comprising a series of rules is shown below. These example rules receive as input, one or more contextual trigger types (e.g., hypothetical, negation, confirm, prior, ignore, etc.), and based on the combination of inputs, a contextual trigger type is assigned to the tentative trigger type. For example, for an input with a hypothetical and negation contextual trigger type, a conflict resolution rule determines that the hypothetical context presides over the negation context, and assigns the tentative trigger type as a hypothetical contextual trigger.

ResolveTypeConflict(hypothetical, negation)=hypothetical

ResolveTypeConflict(hypothetical, confirm)=confirm

ResolveTypeConflict(hypothetical, prior)=hypothetical

ResolveTypeConflict(negation, confirm)=confirm

ResolveTypeConflict(negation, prior)=negation

ResolveTypeConflict(confirm, prior)=prior

ResolveTypeConflict(hypothetical, negation, confirm)=confirm

ResolveTypeConflict(hypothetical, negation, prior)=hypothetical

ResolveTypeConflict(hypothetical, confirm, prior)=prior

ResolveTypeConflict(negation, confirm, prior)=prior

ResolveTypeConflict(hypothetical, negation, confirm, prior)=prior

Figure 4:
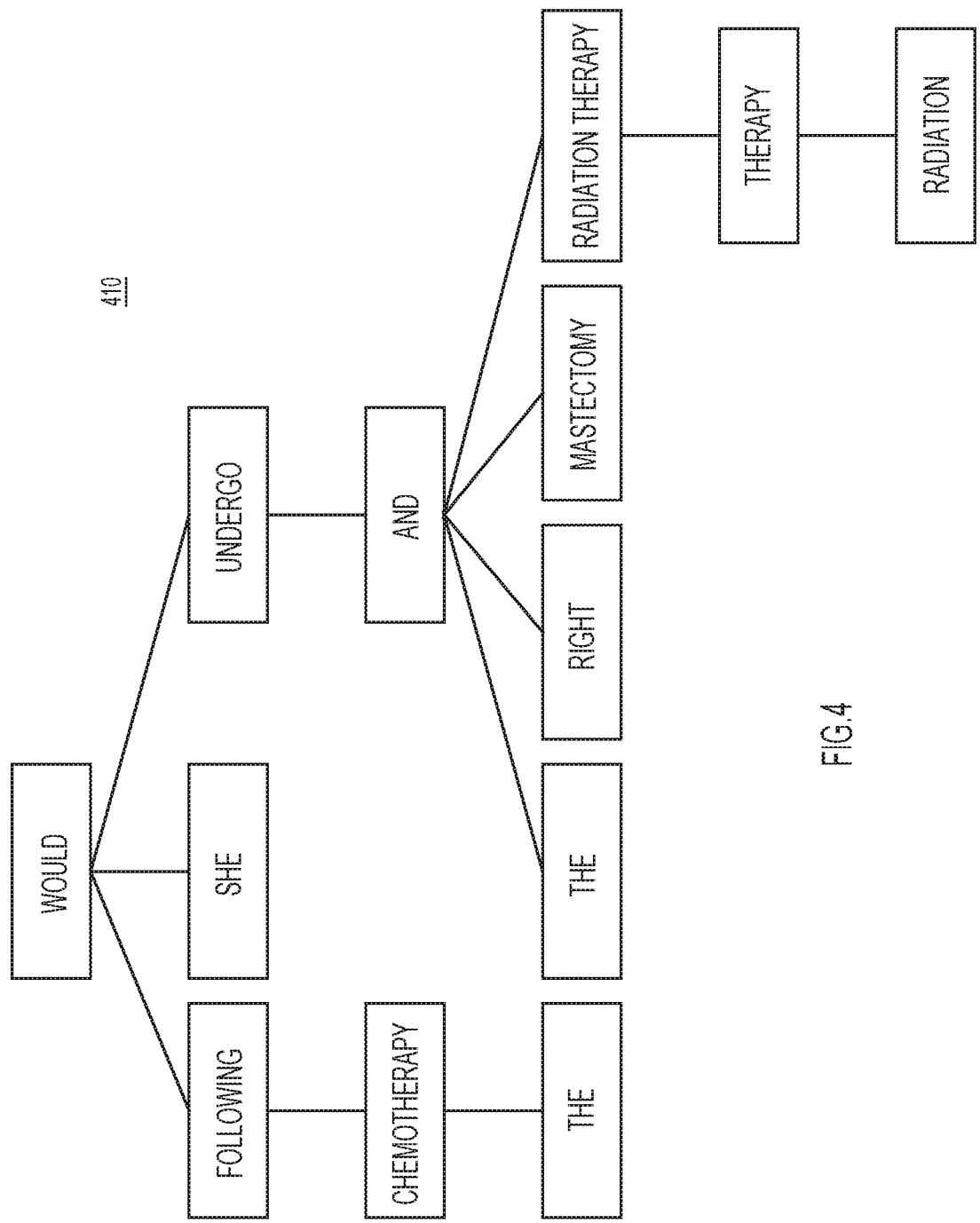
FIG. 4 is a flowchart showing an example parse tree for determining semantic context, according to an embodiment of the present invention.

FIG. 4 shows an example of a parse tree 410 and determination of a tentative trigger type, based on the present embodiments. This sentence, "following the chemotherapy, she would undergo the right mastectomy, and after that radiation therapy" may be analyzed according to the techniques provided herein. Here, the phrase "she would undergo" is a hypothetical trigger, as it has a future tense. Using context scorer 192, the term "chemotherapy" is not found to be within the context of the hypothetical trigger.

However, the term "following" is a tentative trigger, since it is found to be in the context of the hypothetical trigger "she would undergo." Therefore, the phrase "following" is promoted to a hypothetical trigger. When the analysis is repeated after promotion, the context scorer determines that "chemotherapy" is in context of the new hypothetical trigger, and "chemotherapy" is correctly labelled as hypothetical.

FIG. 5 is an operational flow chart showing high level operations of the techniques provided herein. At operation 505, contextual triggers are identified within text. At operation 510, tentative triggers are identified within the text. At operation 520, a parse tree comprising a plurality of nodes is generated corresponding to the text. At operation 530, a determination is made as to whether one or more nodes corresponding to the tentative trigger is within a context of one or more nodes corresponding to the contextual triggers. At operation 540, based on the determination, the tentative trigger type may be assigned to a contextual trigger type.

Various examples are provided below.

In an example, the sentence "following chemotherapy, she would be a candidate for surgery, and then radiation, followed by hormonal therapy with an aromatase inhibitor" may be analyzed according to the techniques provided herein. In this example, "following chemotherapy" may refer to chemotherapy that has already happened, or chemotherapy that may happen. Accordingly, "following" may be identified as a tentative trigger, and the context interpretation may be inferred by considering contextual triggers that provide a context for the tentative trigger. Thus, by considering contextual triggers in the sentence that indicate verb tense, the proper interpretation may be determined. In this case, "she would be" is a hypothetical trigger, since it has a future verb tense. Therefore, with one list entry, the tentative trigger is promoted to a hypothetical trigger. (If the tentative trigger is determined to be in the context of the ignore trigger, the tentative trigger will be promoted to an ignore trigger.)

In another example, the sentence "roughly one month after completion of chemotherapy, surgery would take place and then radiation and hormone therapy" may be analyzed according to the techniques provided herein. In this case, "completion" is a tentative trigger, and "would take place" is a hypothetical trigger. Thus, with one list entry, the tentative trigger is promoted to a hypothetical trigger, and "chemotherapy" can be correctly labelled as hypothetical.

In another example, the sentence "following chemotherapy, she was a candidate for surgery" may be analyzed according to the techniques provided herein. In this case, "following" is a tentative trigger, and "was a candidate," which is past tense, is a prior trigger. Thus, with one list entry, the tentative trigger is promoted to a prior trigger. Because of the tentative trigger, "chemotherapy" can be correctly labelled as a prior trigger.

In another example, the sentence "this disease was diagnosed in December 2014 and so far has been treated with four cycles of gemcitabine and oxaliplatin, followed by surgical resection, followed by neoadjuvant chemoradiation using Xeloda" may be analyzed according to the techniques provided herein. In this case, "followed by" is a tentative trigger, and "has been treated with," which is past tense, is a prior trigger. Accordingly, the tentative trigger is promoted to a prior trigger. Also, "followed by" appears twice in the same sentence, which may lead to an unreliable parse tree. However, based on the techniques provided herein, tentative triggers may be promoted and the results propagated by repeating the process. This allows connecting structures in the parse tree, between the contextual trigger and nodes which are in context of the tentative triggers, to be properly assigned.

In another example, the sentence "this disease was diagnosed in December 2014 and, so far, has been treated with four cycles of gemcitabine and oxaliplatin followed by surgical resection" may be analyzed according to the techniques provided herein. In this case, the tentative trigger is "followed by" and the prior trigger is "has been treated with." Based on the tentative trigger, "surgical resection" can be correctly labelled as a prior trigger.

In another example, the sentence "a 43-year-old man, with a likely T3N0 adenocarcinoma of the rectum, moderately differentiated, status post treatment with capecitabine and concurrent radiotherapy, with subsequent low anterior resection" may be analyzed according to the techniques provided herein. In this case, the tentative trigger is "with subsequent" and the prior trigger is "status post." In this case, the tentative trigger "low anterior resection" can be correctly labelled as a prior trigger.

Present techniques provide an improvement to the field of natural language processing. These techniques improve the identification of contextual triggers. For example, contextual triggers that would otherwise be missed (e.g., due to malformed parse trees, etc.) may be identified and placed in a proper context.

Present approaches may be used to resolve semantic interpretation issues of malformed parse trees, whereas prior approaches often fail to propagate the semantic interpretation of contextual triggers to all nodes which should be in its context. If one or more tentative triggers are in a span (e.g., within a specified distance of words in text, within a specified distance of nodes of a parse tree) of a contextual trigger, the tentative triggers will be promoted to contextual triggers of the same type. This property of local correctness of semantic context allows the correct semantic interpretation to propagate to all nodes which should be included in the contextual span, despite malformation or other issues with the parse tree.

In some aspects, the output of this system may be provided to downstream systems which may make decisions based upon contextual analysis. For example, a system designed to evaluate articles for presentation in an online forum or display may utilize this information to determine whether content is displayed or blocked (e.g., if the article is determined to contain content from contextual analysis that is not allowed for display).

These techniques may be applied to a wide variety of environments, including medical information processing, social media information screening, etc.

It will be appreciated that the embodiments described above and illustrated in the drawings represent only a few of the many ways of implementing embodiments for semantic determination using complex or malformed parse trees to improve natural language processing by machine learning systems.

The environment of the present invention embodiments may include any number of computer or other processing systems (e.g., client or end-user systems, server systems, etc.) and databases or other repositories arranged in any desired fashion, wherein the present invention embodiments may be applied to any desired type of computing environment (e.g., cloud computing, client-server, network computing, mainframe, stand-alone systems, etc.). The computer or other processing system employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, semantic determination system, etc.). These systems may include any type of monitors and input devices (e.g., keyboard, mouse, voice recognition, etc.) to enter and/or view information.

It is to be understood that the software (e.g., semantic determination system 15, including parse tree module 160, trigger identification module 170, conflict resolution module 180, contextual determination module 190, content scorer 192, and contextual promotion module 195, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., semantic determination system 15, including parse tree module 160, trigger identification module 170, conflict resolution module 180, contextual determination module 190, content scorer 192, and contextual promotion module 195, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., lists of tentative triggers, lists of contextual triggers, contextual trigger types, promoted hypothetical triggers, etc.). The database system may be implemented by any number of any conventional or other databases, data stores or storage structures (e.g., files, databases, data structures, data or other repositories, etc.) to store information (e.g., lists of tentative triggers, lists of contextual triggers, contextual trigger types, promoted hypothetical triggers, etc.). The database system may be included within or coupled to the server and/or client systems. The database systems and/or storage structures may be remote from or local to the computer or other processing systems, and may store any desired data (e.g., lists of tentative triggers, lists of contextual triggers, contextual trigger types, promoted hypothetical triggers, etc.).

The present invention embodiments may employ any number of any type of user interface (e.g., Graphical User Interface (GUI), command-line, prompt, etc.) for obtaining or providing information (e.g., lists of tentative triggers, lists of contextual triggers, contextual trigger types, promoted hypothetical triggers, etc.), wherein the interface may include any information arranged in any fashion. The interface may include any number of any types of input or actuation mechanisms (e.g., buttons, icons, fields, boxes, links, etc.) disposed at any location to enter/display information and initiate desired actions via any suitable input devices (e.g., mouse, keyboard, etc.). The interface screens may include any suitable actuators (e.g., links, tabs, etc.) to navigate between the screens in any fashion.

The output may include any information arranged in any fashion, and may be configurable based on rules or other criteria to provide desired information to a user (e.g., semantic classification, etc.).

The present invention embodiments are not limited to the specific tasks or algorithms described above, but may be utilized for any machine learning application in which data is variable. Further, this approach may be generally applicable to providing information in any context, and is not limited to any particular application domain, such as computing services, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for determining semantic relevance in a natural language processing (NLP) system comprising:
    identifying contextual triggers within text, wherein each of the contextual triggers indicate a defined semantic interpretation of a contextual trigger type;
    identifying tentative triggers within the text, wherein each tentative trigger includes an ambiguous semantic interpretation;
    generating a parse tree, comprising a plurality of nodes, corresponding to the text;
    determining whether one or more nodes of the parse tree corresponding to a tentative trigger is within a predetermined number of one or more nodes of the parse tree corresponding to one or more contextual trigger types; and
    based on the determination, assigning to the tentative trigger the contextual trigger type from among the one or more contextual trigger types within the predetermined number of one or more nodes, wherein the one or more contextual trigger types include the contextual trigger type of a prior tentative trigger assigned the contextual trigger type of an associated contextual trigger.

2. The method of claim 1, further comprising:
    generating, for the tentative trigger, a list of the one or more contextual trigger types; and
    performing a contextual trigger type conflict resolution when the list contains more than one contextual trigger type to assign the tentative trigger one of the contextual trigger types from the list.

3. The method of claim 2, wherein assigning further comprises:
    selecting the contextual trigger type for the tentative trigger by mapping a plurality of contextual trigger types to one contextual trigger type.

4. The method of claim 3, further comprising:
    promoting the tentative trigger to the selected contextual trigger type.

5. The method of claim 1, wherein each of the one or more contextual trigger types includes hypothetical, negation, confirm, prior or ignore.

6. The method of claim 1, further comprising:
    propagating an adjusted semantic interpretation from a promoted tentative trigger to one or more nodes of the parse tree.

7. A computer system for utilizing a machine learning system for processing data, the computer system comprising:
    one or more computer processors;
    one or more computer readable storage media;
    program instructions stored on the one or more computer readable storage media for execution by at least one of the one or more computer processors, the program instructions comprising instructions to:
    identify contextual triggers within text, wherein each of the contextual triggers indicate a defined semantic interpretation of a contextual trigger type;
    identify tentative triggers within the text, wherein each tentative trigger includes an ambiguous semantic interpretation;
    generate a parse tree, comprising a plurality of nodes, corresponding to the text;
    determine whether one or more nodes of the parse tree corresponding to a tentative trigger is within a predetermined number of one or more nodes of the parse tree corresponding to one or more contextual trigger types; and
    based on the determination, assign to the tentative trigger the contextual trigger type from among the one or more contextual trigger types within the predetermined number of one or more nodes, wherein the one or more contextual trigger types include the contextual trigger type of a prior tentative trigger assigned the contextual trigger type of an associated contextual trigger.

8. The system of claim 7, wherein the program instructions further comprise instructions to:
   generate a list of the one or more contextual trigger types; and
   perform a trigger type conflict resolution when the list contains more than one contextual trigger type to assign the tentative trigger one of the contextual trigger types from the list.

9. The system of claim 8, wherein the program instructions further comprise instructions to:
   select the contextual trigger type for the tentative trigger by mapping a plurality of contextual trigger types to one contextual trigger type.

10. The system of claim 9, wherein the program instructions further comprise instructions to:
    promote the tentative trigger to the selected contextual trigger type.

11. The system of claim 7, wherein each of the one or more contextual trigger types includes hypothetical, negation, confirm, prior or ignore.

12. The system of claim 7, wherein the program instructions further comprise instructions to:
    propagate an adjusted semantic interpretation from a promoted tentative trigger to one or more nodes of the parse tree.

13. A computer program product for determining semantic analysis, the computer program product comprising one or more computer readable storage media collectively having program instructions embodied therewith, the program instructions executable by a computer to cause the computer to:
    identify contextual triggers within text, wherein each of the contextual triggers indicate a defined semantic interpretation of a contextual trigger type;
    identify tentative triggers within the text, wherein each tentative trigger includes an ambiguous semantic interpretation;
    generate a parse tree, comprising a plurality of nodes, corresponding to the text;
    determine whether one or more nodes of the parse tree corresponding to a tentative trigger is within a predetermined number of one or more nodes of the parse tree corresponding to one or more contextual trigger types; and
    based on the determination, assign to the tentative trigger the contextual trigger type from among the one or more contextual trigger types within the predetermined number of one or more nodes, wherein the one or more contextual trigger types include the contextual trigger type of a prior tentative trigger assigned the contextual trigger type of an associated contextual trigger.

14. The computer program product of claim 13, wherein the program instructions further comprise instructions to:
    generate a list of the one or more contextual trigger types; and
    perform a trigger type conflict resolution when the list contains more than one contextual trigger type to assign the tentative trigger one of the contextual trigger types from the list.

15. The computer program product of claim 14, wherein the program instructions further comprise instructions to:
    select the contextual trigger type for the tentative trigger by mapping a plurality of contextual trigger types to one contextual trigger type.

16. The computer program product of claim 15, wherein the program instructions further comprise instructions to:
    promote the tentative trigger to the selected contextual trigger type.

17. The computer program product of claim 13, wherein each of the one or more contextual trigger types includes hypothetical, negation, confirm, prior or ignore.

18. The computer program product of claim 13, wherein the program instructions further comprise instructions to:
    propagate an adjusted semantic interpretation from a promoted tentative trigger to one or more nodes of the parse tree.

* * * * *